US 11,247,707 B2

(12) United States Patent
LeVey et al.

(10) Patent No.: US 11,247,707 B2
(45) Date of Patent: Feb. 15, 2022

(54) REEL ADAPTER

(71) Applicant: Cerro Wire LLC, Hartselle, AL (US)

(72) Inventors: Kenneth LeVey, Chicago, IL (US);
Michael Howard, Chicago, IL (US)

(73) Assignee: Cerro Wire LLC, Hartselle, AL (US)

( * ) Notice: Subject to any disclaimer, the term of this patent is extended or adjusted under 35 U.S.C. 154(b) by 111 days.

(21) Appl. No.: 16/850,807

(22) Filed: Apr. 16, 2020

(65) Prior Publication Data
US 2020/0331508 A1 Oct. 22, 2020

Related U.S. Application Data

(60) Provisional application No. 62/835,260, filed on Apr. 17, 2019.

(51) Int. Cl.
B62B 1/26 (2006.01)
B65H 75/18 (2006.01)
B65H 75/40 (2006.01)

(52) U.S. Cl.
CPC ........... *B62B 1/264* (2013.01); *B65H 75/185* (2013.01); *B65H 75/403* (2013.01); *B62B 2202/025* (2013.01); *B65H 2405/422* (2013.01)

(58) Field of Classification Search
CPC .... B65H 75/185; B65H 75/14; B65H 75/403; B65H 2701/534; B65H 49/325; B65H 2405/422; B62B 2202/025; B62B 1/264
See application file for complete search history.

(56) References Cited

U.S. PATENT DOCUMENTS

| | | | | |
|---|---|---|---|---|
| 3,614,814 A * | 10/1971 | Hidejiro | ................. | B65H 54/84 19/109 |
| 5,224,662 A * | 7/1993 | Kaussen | ................. | B65H 49/26 242/129.51 |
| 6,045,087 A * | 4/2000 | Vislocky | ................. | B65H 75/14 242/608.2 |
| 6,234,421 B1 * | 5/2001 | Cox | ........................ | B65H 75/14 242/588 |
| 6,341,691 B1 * | 1/2002 | Voss | ..................... | B65D 85/676 206/397 |
| 6,375,116 B1 * | 4/2002 | Askins | ................. | B65H 75/185 242/599.2 |
| 8,366,126 B2 * | 2/2013 | Galgano | .............. | B65H 49/322 280/47.19 |
| 9,648,994 B2 * | 5/2017 | Cattacin | ............... | B65H 75/185 |

(Continued)

Primary Examiner — Michael E Gallion
(74) Attorney, Agent, or Firm — Levenfeld Pearlstein, LLC

(57) ABSTRACT

An adapter for readily changing out and mounting cable reels having a central opening in a transport device, such as a dolly, includes a pair of male portions, each having a body having a projection extending therefrom. The projections have at least one high spot. A pair of female portions are configured for mating with the male portions and have at least one recess for receiving the male portions' projections. A pair of fasteners secure the respective male and female portions to each other. An axle extends between the male or female portions, through the reel central opening and the male or female portions are positioned on ends of the axle. The reel with the axle and the male or female portions is positioned in the reel trolley, with the male or female portions mated with the others of the male or female portions and the fasteners are installed between the respective male and female portions to secure the reel in the trolley.

9 Claims, 2 Drawing Sheets

(56) References Cited

U.S. PATENT DOCUMENTS

| | | | | |
|---|---|---|---|---|
| 9,751,722 B2* | 9/2017 | Kawauchi | ............... | B65H 75/26 |
| 9,770,142 B2* | 9/2017 | Ochoa, Sr. | ............. | A47K 10/16 |
| 9,908,737 B2* | 3/2018 | Chastain | .............. | B65H 75/185 |
| 10,167,101 B2* | 1/2019 | Yu Chen | ................ | B65B 59/003 |
| 10,273,112 B2* | 4/2019 | Alliss | ................. | A01D 34/4165 |
| 10,589,959 B2* | 3/2020 | LeVey | ..................... | B60P 3/035 |
| 2014/0008593 A1* | 1/2014 | Kingery | ................... | B66D 3/02 |
| | | | | 254/376 |
| 2017/0305676 A1* | 10/2017 | Ramezani | .............. | B65G 15/00 |
| 2019/0276266 A1* | 9/2019 | Nilsson | ................. | B65H 75/14 |

* cited by examiner

REEL ADAPTER

CROSS-REFERENCE TO RELATED APPLICATION DATA

This application claims the benefit of and priority to Provisional U.S. Patent Application Ser. No. 62/835,260, filed Apr. 17, 2019, titled REEL ADAPTER, the disclosure of which is incorporated herein in its entirety.

BACKGROUND

Cable reels are used to store, transport, take up and pay out supplies of cables, wires and the like. Known cable reels include opposed, generally circular, end flanges and a spool between the opposed end flanges. The spool has a diameter less than that of the end flanges. The cable, wire or the like is wound around the spool and stored for transport.

Cable reels may be transported, for example, by truck, from a facility to a work site. One delivered to the work site, the cable reels may be moved to locations on-site where the cable or wire may be paid out. The cable reel may be moved, for example, by rolling across a work site on the end flanges.

Advancements have been made in the transport of cable reels on, for example, work sites. On such advancement is disclosed in LeVey, U.S. Pat. No. 10,589,959, the disclosure of which is incorporated herein by reference. The LeVey patent discloses a driven reel trolley on which a cable reel is stored and can be readily transported around a worksite that may include rough and uneven terrain. The trolley uses standard or custom reels that are mounted to an axle that extends between upright posts on the trolley.

While the trolley functions well and provides for easy and reliable movement of cable reels around a worksite, there may, at times, be reels that do not readily mount to the trolley or that have a different mounting arrangement. It may also be required to swap reels to, for example, exchange/replace the type of cable being paid-out or to replenish the cable.

Accordingly, there is a need for a system for readily changing out and mounting cable reels in a transport device. Desirably, such a system can be used with different reels and allows for quickly adapting reels to a common drive system.

SUMMARY

According to an embodiment an adapter is configured for positioning a reel, such as a cable reel having a central axially formed opening, and the adapter into a transport device, such as a reel trolley for readily changing out and mounting the cable reel in the trolley. The adapter can be used with different reels and allows for quickly adapting reels to a common drive system.

The adapter includes a pair of first portions, each first portion having a male end having a body having a projection extending therefrom. The projections have at least one high spot. A pair of second portions each has a female end configured for mating with the male portion. The female portions have at least one recess for receiving the male portion projection.

A pair of fasteners secure the respective male portions to their respective female portions. An axle extends between a pair of male or female portions at the ends of the axle. The other of the male or female portions are mounted on or in the trolley.

When the axle is positioned in the reel central opening with the male or female portions positioned on ends of the axle, the reel with the axle and the pair of (male or female) portions is positioned in the reel trolley, the pair male or female portions is mated with the other of the pair of male or female portions on or in the trolley, and the fasteners are installed between the respective male and female portions to secure the reel in the trolley.

In an embodiment, the pair of male portions is mounted on the axle. In an embodiment, the pair of female portions is mounted on the axle. The axle can be formed integral with one of the male or female portions of the adapter.

In an embodiment, the male portions include multiple high spots and the female portions include multiple high spots in their recesses to receive the male portions' high spots. The male portions can include, for example, include eight (8) high spots and the female portions can include eight (8) high spots in their recesses to mate with the male portion high spots. In such an embodiment, the projection can have an octagonal shape and the recess can have an octagonal shape.

The fasteners can be inserted into a central opening in the female and male portions to secure the female and male portions to one another. The fastener can be, for example, threaded bolts.

These and other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
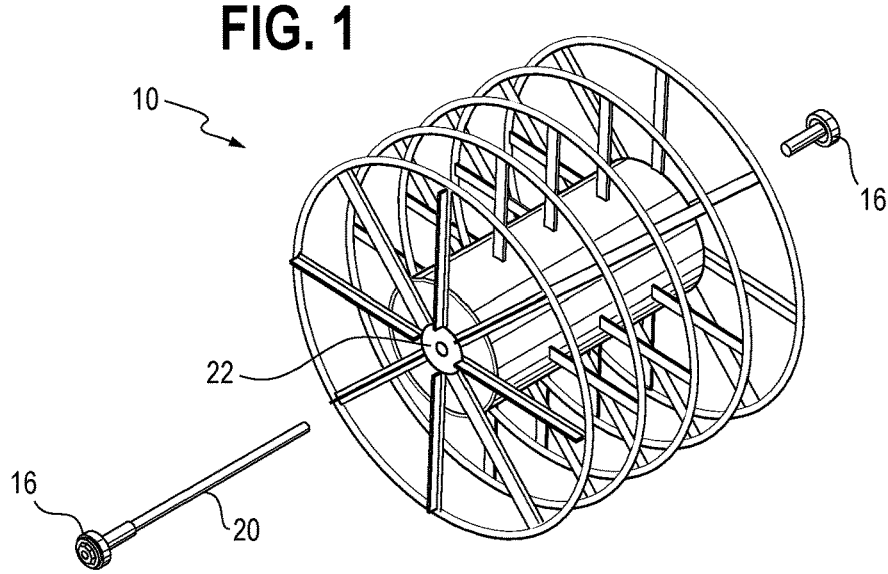
FIG. 1 is a perspective view of a sectioned or compartmented reel and a first portion of an embodiment of a reel adapter in an exploded view relative to the reel.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Referring to FIG. 1, there is shown a compartmented reel 10 and an embodiment of an adapter 12 for use with the reel 10. Although the present adapter 12 is shown with a compartmented reel 10, it will be appreciated that the present adapter 12 can be used with any type of reel 10 that stores, and from which cable, wire and the like may be paid-out. The reel adapter 12 may be used with a trolley 14, such as that illustrated in FIG. 5, and as disclosed in the aforementioned patent to LeVey, U.S. Pat. No. 10,589,959.

Figure 2:
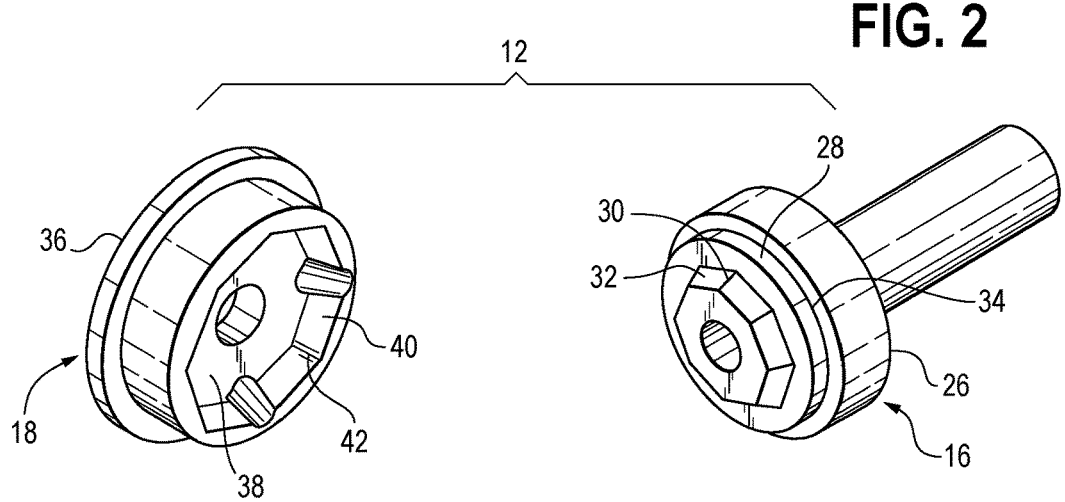
FIGS. 2A-2B illustrate an embodiment of a female portion (FIG. 2A) and an embodiment of a male portion (FIG. 2B) of an adapter.
Figure 3:
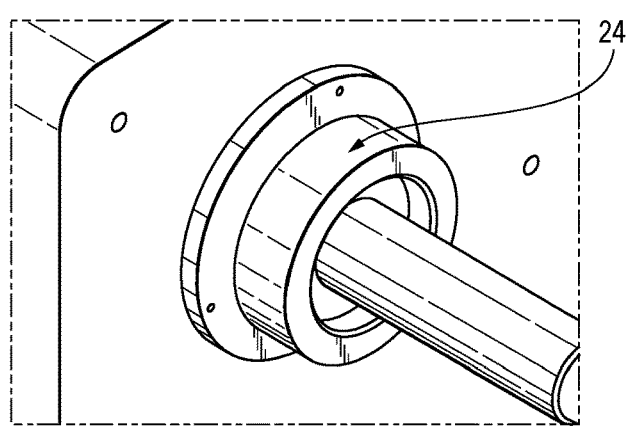
FIG. 3 is an illustration of the female and male adapter portions of FIGS. 2A and 2B mated with one another.
Figure 4:
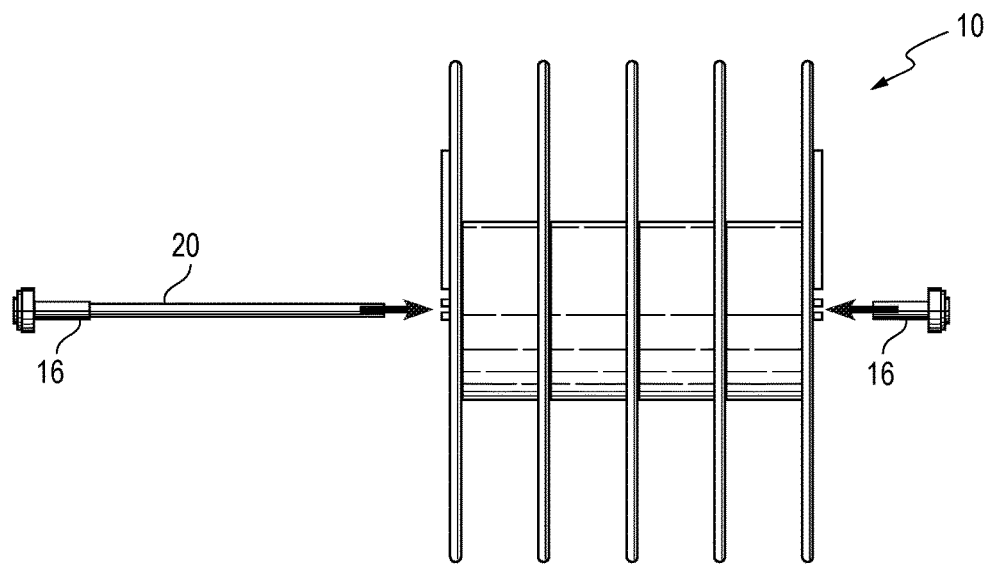
FIG. 4 is an illustration of the two ends of the male adapter portions being inserted into a bore of a compartmented reel.

Referring briefly to FIG. 2, the adapter 12 includes first and second portions, one of which can be a male portion, for example, portion 16, and the other of which can be a female portion, for example, portion 18. As will be discussed in more detail below, one of the portions, for example, the male portion 16 can include an arbor or axle 20 that is positioned through a bore 22 in the reel 10 and the other portion, for example, the female portion 18 can be affixed to or formed as part of the trolley 14, for example, as part of the trolley transmission 24. Although not shown, that adapter can be configured with the axle mounted to the female portion and the male portion formed as part of the trolley.

The portion 16 of the adapter 12 that includes the axle 20 can be configured as an integral, unitary member, or the axle 20 can be fitted into or onto the adapter portion 16 and the axle 20 and adapter portion 16 secured to one another. It will be understood from a study of the figures and the present disclosure that an adapter 12, that is, a male portion 16 and a female portion 18 is fitted onto both ends of the axle or arbor 20 as the reel 10 is mounted to a device, such as the illustrated trolley 14. Accordingly, although reference may be made to singular items, it is to be understood that many of the features disclosed are multiple (or at least pairs, for example, of adapters 12) and that reference in the singular, it is to be understood to apply to such multiple features.

The male portion 16 of the adapter 12 includes a body 26 having a projection 28 extending therefrom. In an embodiment, the projection 28 has at least one, and in the illustrated embodiment, multiple high spots 30. As seen in FIG. 2B, the projection 28 can have an octagonal shape, in which case the projection 28 has eight (8) high spots 30. The illustrated projection 28 also has eight (8) flats 32 between the high spots 30. The projection 28 can include a stepped down region 34 extending from the body 26, from which the projection 28 extends.

The female portion 18 is configured to mate with the male portion 16. In an embodiment, as seen in FIG. 2A, the female portion 18 has a body 36 having a recess 38 that mates with the male portion projection 28. In the illustrated embodiment, the recess 38 has eight (8) flats 40 and eight (8) peaks 42 that mate with the male portion projection high spots 30 and flats 32. In this manner, when the male and female portions 16, 18 are mated with one another they will move, e.g., rotate with each other, and will stop movement, e.g., stop rotation with each other.

In an embodiment in which the reel 10 and adapter 12 are used with the illustrated trolley 14, the female portions 18 of the adapter 12 may be mounted within or to the trolley transmission 24. In this manner, the axle or arbor 20 is locked to the trolley transmission 24. As noted in the LeVey publication, the female portion 18 can serve as a locking hub on an inside surface of the leg 44 of the trolley 14, so that the axle or arbor 20 does not extend outwardly of the trolley 14 when the reel 10 is mounted thereto. A fastener 46, such as a bolt or the like (e.g., a threaded bolt) can lock the male and female portions 16, 18 to one another. For example, the inside of the male portion 16 can include a thread such that the bolt 46 is inserted through the female portion 18 and into the male portion 16 (and binds on the female portion 18) to lock the two portions 16, 18 to one another.

Figure 5:
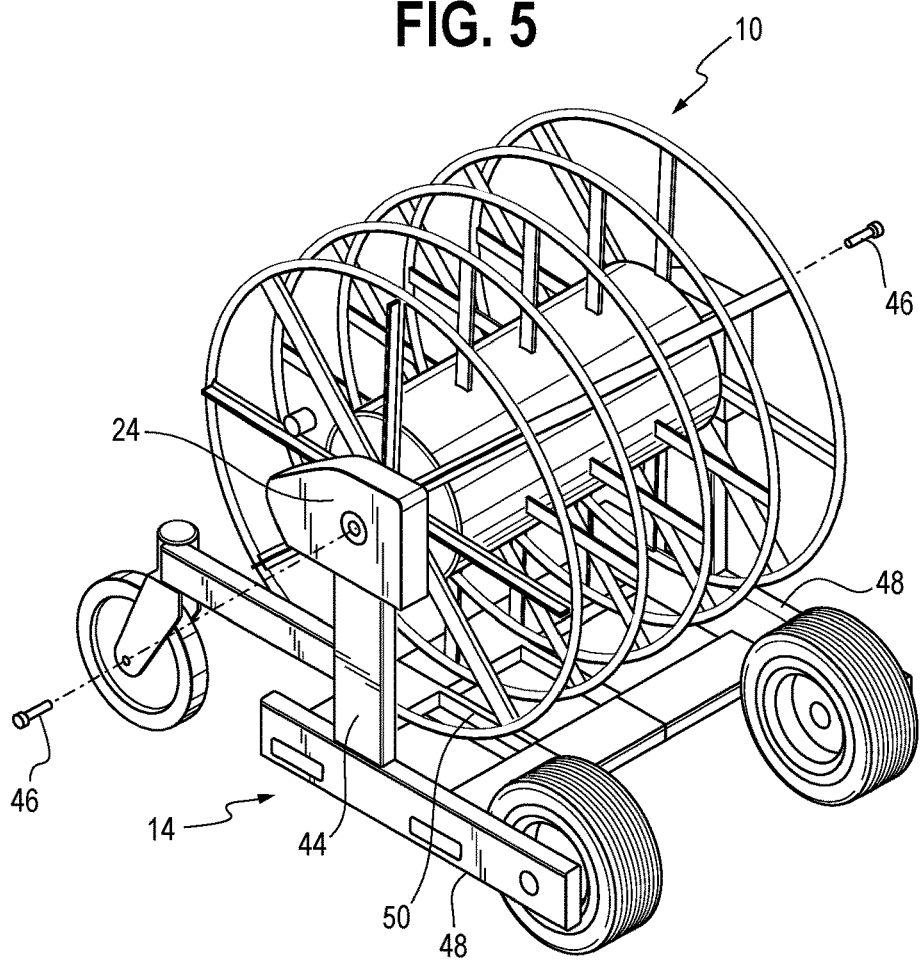
FIG. 5 illustrates the adapter in place and fasteners (bolts) inserted into the adapter to secure the reel in place in the trolley.

In use, the arbor or axle 20 are positioned in the reel bore 22 and the male portions 16 are mounted to the ends of the axle 20 (note that one of the male portions 16 may be formed as part of the axle 20). The reel 10 with the male portions 16 is then positioned in the trolley 14 or other device to which the reel 10 is to be mounted. As seen in FIG. 5, the trolley 14 has opposing sections 48 that are bolted to one another by a slotted arrangement 50. This allows the sections 48 to be flexed relative to one another so that the reel 10 with the adapters 12 can be fitted onto the trolley 14 between the sections 48 (between the transmission 24 hubs). Once the reel 10 with the adapters 12 is in place, the fasteners 46 (bolts) can be installed to secure the male and female portions 16, 18 of the adapter 12 to one another. To remove and/or replace the reel 10 and adapters 12, the fasteners 46 are removed and the trolley sections 48 flexed to readily remove the reel 10 from the trolley 14.

It will be appreciated by those skilled in the art that the relative directional terms such as sides, upper, lower, rearward, forward and the like are for explanatory purposes only and are not intended to limit the scope of the disclosure.

All patents referred to herein, are hereby incorporated herein in their entirety, by reference, whether or not specifically indicated as such within the text of this disclosure.

In the present disclosure, the words "a" or "an" or "the" are to be taken to include both the singular and the plural, where appropriate, and that any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. An adapter for positioning a reel and the adapter into a reel trolley, reel having a central axially formed opening, the adapter comprising:
   a pair of first portions, each first portion having a male end having a body having a projection extending therefrom, the projection having at least one high spots;
   a pair of second portions, each second portion having a female end configured for mating with the male portion, the female portion having at least one recess for receiving the male portion projection;
   a pair of fasteners for securing the respective male portions to their respective female portions;
   an axle extending between one of the pair of first portions or the pair of second portions,
   wherein when the axle is positioned in the reel central opening and one of the pairs of first or second portions are positioned on ends of the axle, the reel with the axle and the one of the pairs of first or second portions is positioned in the reel trolley, the one of the pairs of first or second portions is mated with the other of the pair of first or second portions and the fasteners are installed between the respective male portions and their respective female portions to secure the reel in the trolley.

2. The adapter of claim 1, wherein the pair of first portions is mounted on the axle.

3. The adapter of claim 1, wherein the pair of second portions is mounted on the axle.

4. The adapter of claim 1 wherein the axle is formed integral with one of the first portions or one of the second portions.

5. The adapter of claim 1, wherein the first portions include multiple high spots and the second portions include multiple high spots to receive the first portions' high spots.

6. The adapter of claim 5, wherein the first portions include eight (8) high spots and the second portions include eight (8) high spots.

7. The adapter of claim 6, wherein the projection has an octagonal shape and the recess has an octagonal shape.

8. The adapter of claim 1 wherein the fasteners are inserted into a central opening in the female and male portions to secure the female and male portions to one another.

9. The adapter of claim 8, wherein the fastener is a threaded bolt.

\* \* \* \* \*